(12) United States Patent
Le et al.

(10) Patent No.: US 9,446,306 B2
(45) Date of Patent: Sep. 20, 2016

(54) SYSTEM AND METHOD FOR LOCAL MULTIPLAYER GAMING

(71) Applicant: THE REGENTS OF THE UNIVERSITY OF CALIFORNIA, Oakland, CA (US)

(72) Inventors: Minh Thoai Anh Le, Santa Ana, CA (US); Lorenzo Keller, Arbedo (CH); Athina Markopoulou, Irvine, CA (US); Christina Fragouli, Lausanne (CH)

(73) Assignees: THE REGENTS OF THE UNIVERSITY OF CALIFORNIA, Oakland, CA (US); ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 251 days.

(21) Appl. No.: 13/841,956

(22) Filed: Mar. 15, 2013

(65) Prior Publication Data
US 2014/0024447 A1    Jan. 23, 2014

(30) Foreign Application Priority Data
Jul. 19, 2012 (EP) .................................... 12177086

(51) Int. Cl.
*A63F 13/00* (2014.01)
*A63F 9/24* (2006.01)
(Continued)

(52) U.S. Cl.
CPC ............. *A63F 13/12* (2013.01); *A63F 13/327* (2014.09); *A63F 13/34* (2014.09); *A63F 13/358* (2014.09); *H04L 67/38* (2013.01)

(58) Field of Classification Search
CPC ...... A63F 13/12; A63F 13/34; A63F 13/327; A63F 13/358

USPC .......................................... 463/16, 20, 40, 42
See application file for complete search history.

(56) References Cited

U.S. PATENT DOCUMENTS 7,158,798 B2 * 1/2007 Lee et al. .................. 455/456.3
7,762,887 B1    7/2010 House et al.
(Continued)

FOREIGN PATENT DOCUMENTS

WO    WO 2012/026666 A2    3/2012
WO           WO                2/2014
      PCT/US2013/051378

OTHER PUBLICATIONS

Chen et al, "HIMAC: High Throughput MAC Layer Multicasting in Wireless Networks", IEEE International Conference on Mobile Ad Hoc and Sensor Systems, Oct. 2006, p. 41-50.*

(Continued)

*Primary Examiner* — Jay Liddle
*Assistant Examiner* — Ryan Hsu
(74) *Attorney, Agent, or Firm* — One LLP

(57) ABSTRACT

A system and method for local multiplayer gaming are disclosed. According to one embodiment, a system comprises a plurality of mobile client devices including a mobile client device designated as a server device. Each mobile client device comprises a display, at least one local network interface for communication with said server device and a processor. The processor is programmed for playing a multiplayer game with other mobile client devices and rendering on said display a game situation depending on commands sent by a plurality of mobile client devices to said server device over said at least local network interface. At least one of said mobile client devices is configured for overhearing commands sent by at least one other mobile client device to said server device or another mobile client device and for rendering on its display a game situation depending on said overheard command.

15 Claims, 8 Drawing Sheets

(51) Int. Cl.
*A63F 13/30* (2014.01)
*A63F 13/34* (2014.01)
*A63F 13/358* (2014.01)
*A63F 13/327* (2014.01)
*H04L 29/06* (2006.01)

(56) References Cited

U.S. PATENT DOCUMENTS

| | | | | |
|---|---|---|---|---|
| 8,619,623 | B2* | 12/2013 | Chhabra | 370/254 |
| 8,628,420 | B2* | 1/2014 | Chhabra | 463/42 |
| 2006/0018319 | A1* | 1/2006 | Palin et al. | 370/390 |
| 2007/0099703 | A1 | 5/2007 | Terebilo | |
| 2007/0149279 | A1* | 6/2007 | Norden et al. | 463/29 |
| 2008/0039125 | A1* | 2/2008 | Fan et al. | 455/500 |
| 2008/0220878 | A1* | 9/2008 | Michaelis | 463/42 |
| 2008/0310409 | A1* | 12/2008 | Larsson | H04L 1/004 370/389 |
| 2009/0191954 | A1* | 7/2009 | Ly | 463/25 |
| 2009/0209268 | A1* | 8/2009 | Ha | G01S 5/0289 455/456.1 |
| 2010/0197405 | A1 | 8/2010 | Douceur et al. | |
| 2011/0230269 | A1 | 9/2011 | Serafat et al. | |
| 2012/0150952 | A1 | 6/2012 | Beverly | |

OTHER PUBLICATIONS

Bethea, D., et al., "Server-side Verification of Client Behavior in Online Games", ACM Transactions on Information and System Security, 2011, vol. 14, No. 4, pp. 1-17.

Bousetta, K., et al., "Effects of packetization delay on multiplayer gaming experience over ad hoc networks", Wireless Days (WD), 2011, pp. 1-6.

Cronin, E., et al., "A Distributed Multiplayer Game Server System", University of Michigan, 2001, pp. 1-42.

Kaneda, Y., et al., "ANGEL : A Hierarchical State Synchronization Middleware for Mobile Ad-hoc Group Gaming", Pergames, 2004, pp. 1-6.

Le, A., et al., "MicroPlay: A Networking Framework for Local Multiplayer Games", MobiGame, 2012, pp. 13-18.

Erturk, Umut Riza, "Multiplayer Online Games", Hacettepe University, 2011, pp. 1-24.

* cited by examiner

SYSTEM AND METHOD FOR LOCAL MULTIPLAYER GAMING

The present application claims the benefit of and priority to E.P. Provisional Application No. 12177086 titled "SYSTEM AND METHOD FOR LOCAL MULTIPLAYER GAMING", filed on Jul. 19, 2012, which is hereby incorporated by reference in its entirety.

The present application is related to U.S. patent application Ser. No. 13/841,500, titled "System and Method for Cooperative Data Streaming," filed on Mar. 15, 2013, the disclosure of which is incorporated herein in its entirety.

FIELD

The present disclosure relates generally to mobile device communications and, more particularly, to systems and methods that facilitate local multiplayer gaming.

BACKGROUND

Smartphone ownership has seen tremendous rate of growth in recent years. One of the fastest growing sectors of smartphone applications is mobile games. In fact, mobile games consistently dominate the list of top applications downloaded in both Android and iOS markets. The popularity of mobile games has led to innovations in both hardware and software, e.g., from the introduction of mobile quad-core CPUs to 3D sensor-based games.

Smartphones offer opportunities for mobile game players to engage in highly interactive, local multi-player game activities, also known as LAN parties. These activities offer high levels of satisfaction and entertainment to the participants, as they allow them to interact with each other on the spot while playing the games. With a traditional gaming platform, such as PCs, gamers have to make a significant effort to setup a LAN game party, e.g., planning the time and arranging a powered table space. In contrast, smartphones are usually carried by the owners, operate on battery, and have small footprints, making them an ideal gaming platform for spontaneous, local multiplayer games.

The strategies used to synchronize game state in multiplayer games can be divided in two groups: client-server and peer-to-peer. In the first approach, players synchronize their local game states with the authoritative state held by the server. In the peer-to-peer approach, no single peer is responsible for the game state. Instead, the state is synchronized using a distributed protocol run by all players. The advantages of the client-server model are that it is easier to implement and more resilient to cheating. The appeal of the second approach is that it obviates the need of expensive servers and no node in the network must be present for the duration of the game. There are also efforts to build peer-to-peer based games that are resilient to cheating.

The recent popularity and powerful capabilities of smartphones and mobile devices (including tablets) have enabled development of multiplayer games over wireless networks. Current commercial engines essentially re-use the approaches designed for the wired setup over wireless. Highly interactive multiplayer games, such as FPS, have been implemented both over LAN and wide-area networks (WAN); the latter have much larger network latency. Commercial solutions employ mechanisms that can cope with this large latency over WANs, and simply reuse these mechanisms over the lower latency LANs as well. In the academic community, solutions have been proposed to deal with the high latency of the wireless WAN links and the performance of various broadcasting schemes, such as flooding and distance-based broadcast, has been studied. Multicast has also been proposed to distribute game commands and states, but has not been used in commercial systems.

SUMMARY

A system and method for local multiplayer gaming are disclosed. According to one embodiment, a system comprises a plurality of mobile client devices including a mobile client device designated as a server device. Each mobile client device comprises a display, at least one local network interface for communication with said server device and a processor. The processor is programmed for playing a multiplayer game with other mobile client devices and rendering on said display a game situation depending on commands sent by a plurality of mobile client devices to said server device over said at least local network interface. At least one of said mobile client devices is configured for overhearing commands sent by at least one other mobile client device to said server device and for rendering on its display a game situation depending on said overheard command.

The systems, methods, features and advantages of the invention will be or will become apparent to one with skill in the art upon examination of the following figures and detailed description. It is intended that all such additional methods, features and advantages be included within this description, be within the scope of the invention, and be protected by the accompanying claims. It is also intended that the invention is not limited to require the details of the example embodiments.

BRIEF DESCRIPTION

The accompanying drawings, which are included as part of the present specification, illustrate the presently preferred embodiment and, together with the general description given above and the detailed description of the preferred embodiment given below, serve to explain and teach the principles of the present invention.

Figure 1:
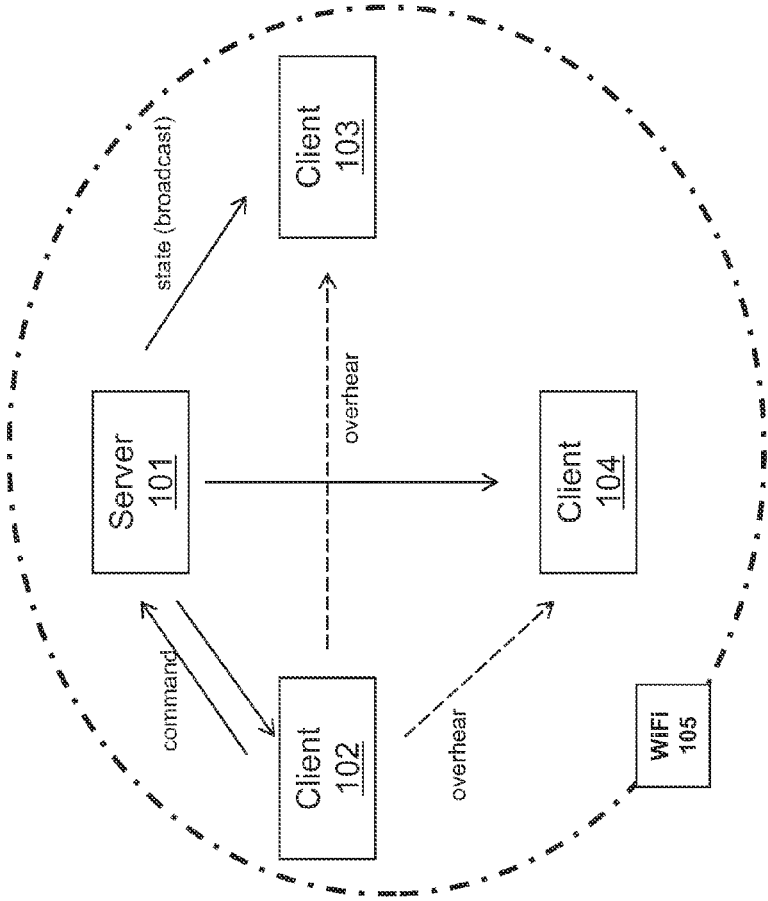
FIG. 1 illustrates an exemplary networking model for use with the present system, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described

DETAILED DESCRIPTION

A system and method for local multiplayer gaming are disclosed. According to one embodiment, a system comprises a plurality of mobile client devices including a mobile client device designated as a server device. Each mobile client device comprises a display, at least one local network interface for communication with said server device and a processor. The processor is programmed for playing a multiplayer game with other mobile client devices and rendering on said display a game situation depending on commands sent by a plurality of mobile client devices to said server device over said at least local network interface. At least one of said mobile client devices is configured for overhearing commands sent by at least one other mobile client device to said server device and for rendering on its display a game situation depending on said overheard command.

Smartphones and other mobile devices (including tablets) are an ideal platform for local multiplayer games, thanks to their computational and networking capabilities as well as their popularity and portability. However, existing game engines do not exploit the locality of players to improve game latency.

The present system is directed to a complete networking framework for local multiplayer mobile games. The present system is also directed to low delay multi party applications. The present system exploits local connections between mobile devices and the broadcast nature of the wireless medium to provide smooth, accurate rendering for all players with two desired properties. First, it performs direct-input rendering (i.e., without any inter- or extrapolation of game state) for all players. Second, it provides very low latency. Implementation of the present system in an exemplary prototype (e.g. on Android phones with an exemplary multiplayer racing game) indicates that cars can be rendered smoothly, without any prediction of state, and with only 20-40 ms game latency (for example).

One challenge of developing multi-player games is game latency, i.e., the delay between when one of the players inputs a command and when the results of the command are rendered on the screens of all players. Local multiplayer games on smartphones have two important characteristics: (i) the phones are connected via a common wireless network (e.g., WiFi) and (ii) the players are typically close to each other. The present system exploits these two characteristics to significantly reduce game latency and, at the same time, simplifies multi-player games development. In particular, the present system eliminates the need for game state prediction.

The present system exploits local connections and overhearing, for collaboration between devices within proximity of each other. The present system is directed to an application scenario including multiplayer games. An objective of the present system is to deliver game-related packets, which are much smaller than video packets, to all players with minimum latency.

According to one embodiment, the present system explicitly uses local connections between smartphones and exploits overhearing over the shared wireless medium (WiFi). In particular, games are hosted locally, i.e., one of the phones acts as a server and the others act as clients. The packets sent to the server can be overheard by other players' devices. Using the overheard packets, the local game engine of each player can render the movements of the other players precisely, without the need to make predictions about the other players' movements.

This design brings benefits both in terms of performance (low game latency, sufficient even for games with the most stringent delay requirements, such as first person shooter (FPS) and racing games) and simplified game development (unlike other engines, it does not rely on game state prediction). Furthermore, it enables spontaneous setup of local multiplayer games.

According to one embodiment, the present system provides a user interface that enables phones to easily setup a local network and establish all the necessary connections to play a game on-the-fly, without the need of existing network infrastructure, such as local access point or Internet connectivity. This significantly reduces the overhead of setting up multiplayer games.

The present system can be applied to any mobile device, including without limitation a mobile phone, a tablet, a music player device, a GPS mobile navigation device, a camera, a video camera, or a personal digital assistant (PDA). The term player is used interchangeably with phone and/or mobile device throughout this description.

The expression "typically close to each other" related to mobile devices indicates that the distance between mobile devices is such that the mobile devices can communicate by exploiting, e.g., a Bluetooth, WiFi, ZigBee or NFC interface. For example this distance can be greater than 20 m, less than 5 m, or 2 m. The number of mobile devices in the group can be also greater than 6.

Although the examples described herein are related to the mobile device Android-based, the present system can be applied to mobile devices using other operating system as for example Symbian, Apple iOS, RIM BlackBerry, MeeGo, Windows Phone, Boot2Gecko (B2G) and Bada.

Although the examples described herein are related to a multiplayer gaming application, the present system can be applied to other multi party applications where low latency is desired.

Other programming languages, different from the mentioned Java and C, can be used in the context of the present system, for example and not in a limiting way C++, Python, or Celyon.

Although mention is made of multiple electronic modules, it will be appreciated that all of the electronic modules described herein can be the same electronic module.

To illustrate the present system, an implementation in Java and C is described herein. An exemplary multiplayer racing game, referred to herein as Racer (based on AndEngine, an open-source Android game engine) is used for performance comparisons herein.

FIG. 1 illustrates an exemplary networking model for use with the present system, according to one embodiment. According to one embodiment, the present system adopts a client-server model similar to what is currently used by the majority of commercial game engines. In this model, one of the mobile devices in a group of mobile devices acts as the server 101 and the rest act as clients 102, 103, 104. The server 101 and the clients 102, 103, 104 participate in the game. The server 101 is responsible for updating and distributing the game state. To this end, the server 101 and clients 102, 103, 104 communicate with each other using a local WiFi network 105.

According to one embodiment, when a client 102 inputs a command, the command is put into a command packet and sent to the server 101. The server processes the command and updates the game state. The server sends, periodically, the updated game state (i.e., snapshot of the game) in a state packet to all of the clients 102, 103, 104. The clients 102, 103, 104 then render the new game state. According to one embodiment, command packets are sent by the clients very frequently, e.g., every 12-20 ms, and state packets are sent by the server less frequently, e.g. every 50-80 ms, as illustrated in FIG. 2A.

Figure 2A:
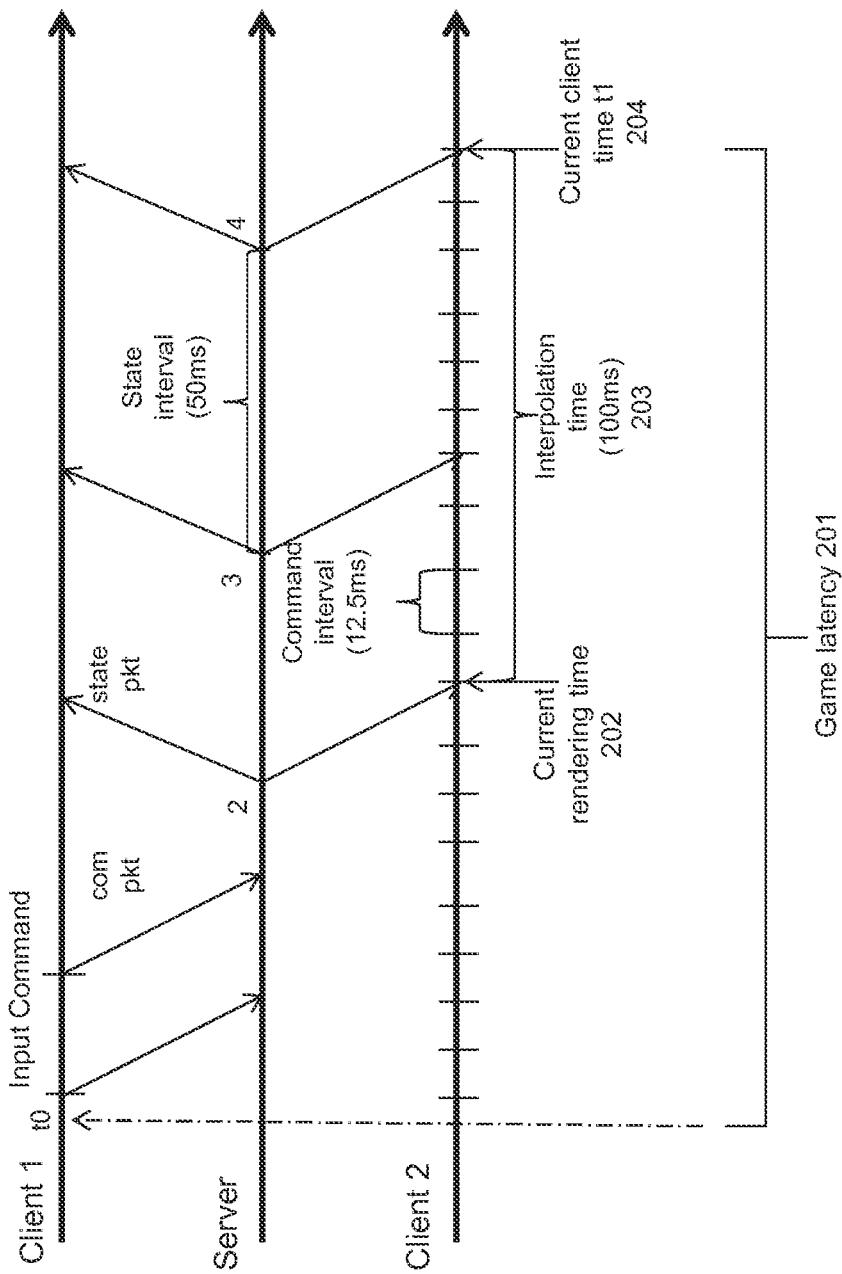
FIG. 2A illustrates game latency in a prior art multiplayer networking framework.

FIG. 2A illustrates game latency 201 in a prior art multiplayer networking framework. If a client rendered the game based only on the discrete game states sent by the server, moving objects would look choppy and jittery. Also, missing state packets would cause noticeable glitches. To address these problems, the present system buffers the received states and renders states that are slightly in the past (illustrated in FIG. 2A). The client has received up to snapshot 4; however, it has only rendered up to snapshot 2 and still buffers 3 and 4.

With this buffering technique, first, animation of objects between game states can be smoothly rendered by interpolating the state of the objects between the latest rendered game state and the immediate next game state, e.g., snapshots 2 and 3 in FIG. 2A. Second, loss of a single game state update can be tolerated. For instance, if snapshot 3 is lost, the client can still render the game by interpolating between snapshots 2 and 4. The interpolation time 203 is usually chosen large enough to include two snapshots. Furthermore, when no information about an existing object is available in the buffered snapshots, the client will try to extrapolate the object state, i.e., predicting its future state, using the currently known information (e.g., velocity and position).

However, buffering also causes a constant game latency, as shown in FIG. 2A. The delayed visual feedback due to game latency makes it hard to move or aim precisely. To overcome this, each player's local game engine adopts a technique called input prediction, where the client predicts the results of its own user commands and renders them immediately (referred to herein as direct-input rendering). This makes the game feel more interactive. For example, in FIG. 2A, although the rendering time 202 only includes state 2, the player updates its own state using its own input commands up to the current time 204. With direct-input rendering, the client does not have to interpolate its own player since exact commands are executed. Thus, the rendering of the local player is accurate. Direct-input rendering, however, is not possible for other players, and the local game engine has to resort to inter- or extrapolation to render them.

According to one embodiment, the present system exploits the nature broadcast of WiFi to enable direct-input rendering for all players. In particular, the present system allows a client to overhear command packets sent by all other clients to the server and use them to perform direct-input rendering.

Figure 2B:
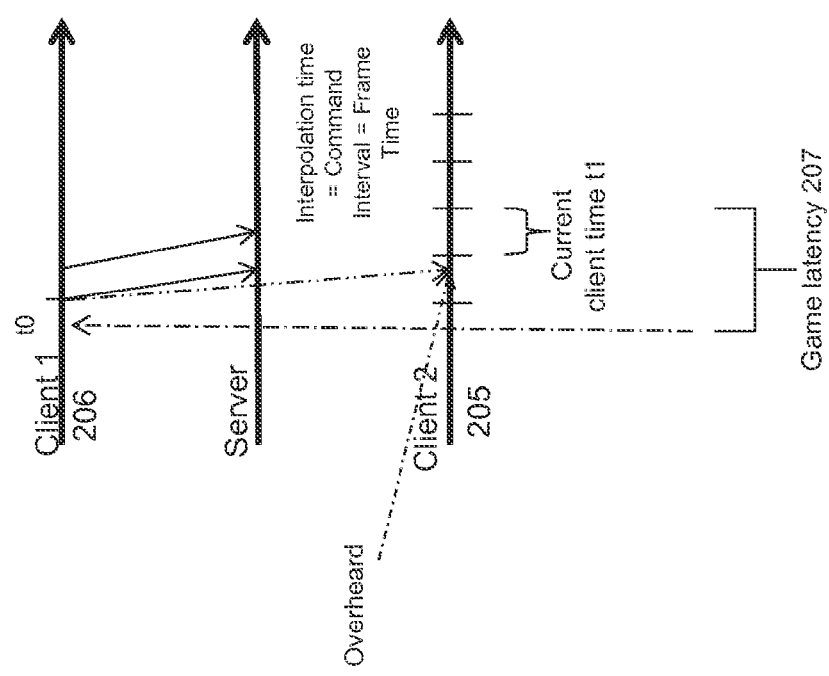
FIG. 2B illustrates game latency in accordance with the present system, according to one embodiment.

FIG. 2B illustrates game latency 207 in accordance with the present system, according to one embodiment. FIG. 2B illustrates how a client (client 2 205) performs direct-input rendering for objects of another client (client 1 206). There are two key benefits with this approach: precise rendering and low game latency.

When direct-input rendering is available for all players, the rendering of other players and their objects can be done similar to the local ones. Hence, there is no longer need for performing inter- or extrapolation. Note that direct-input rendering is strictly more accurate than rendering using these predictions. The elimination of state prediction code also brings many side benefits: it simplifies game development (simpler and more maintainable objects' update code), reduces processing needed at each phone, and improves scalability when the number of players or interactive objects increases.

The interpolation time can be eliminated since (i) no interpolation is needed and (ii) the loss of state packets is not as critical as before, thanks to the overheard command packets. In the present system, the interpolation time is reduced to the average in-game frame rendering time, 20 ms (50 frames per sec.), as illustrated in FIG. 2B.

Figure 3:
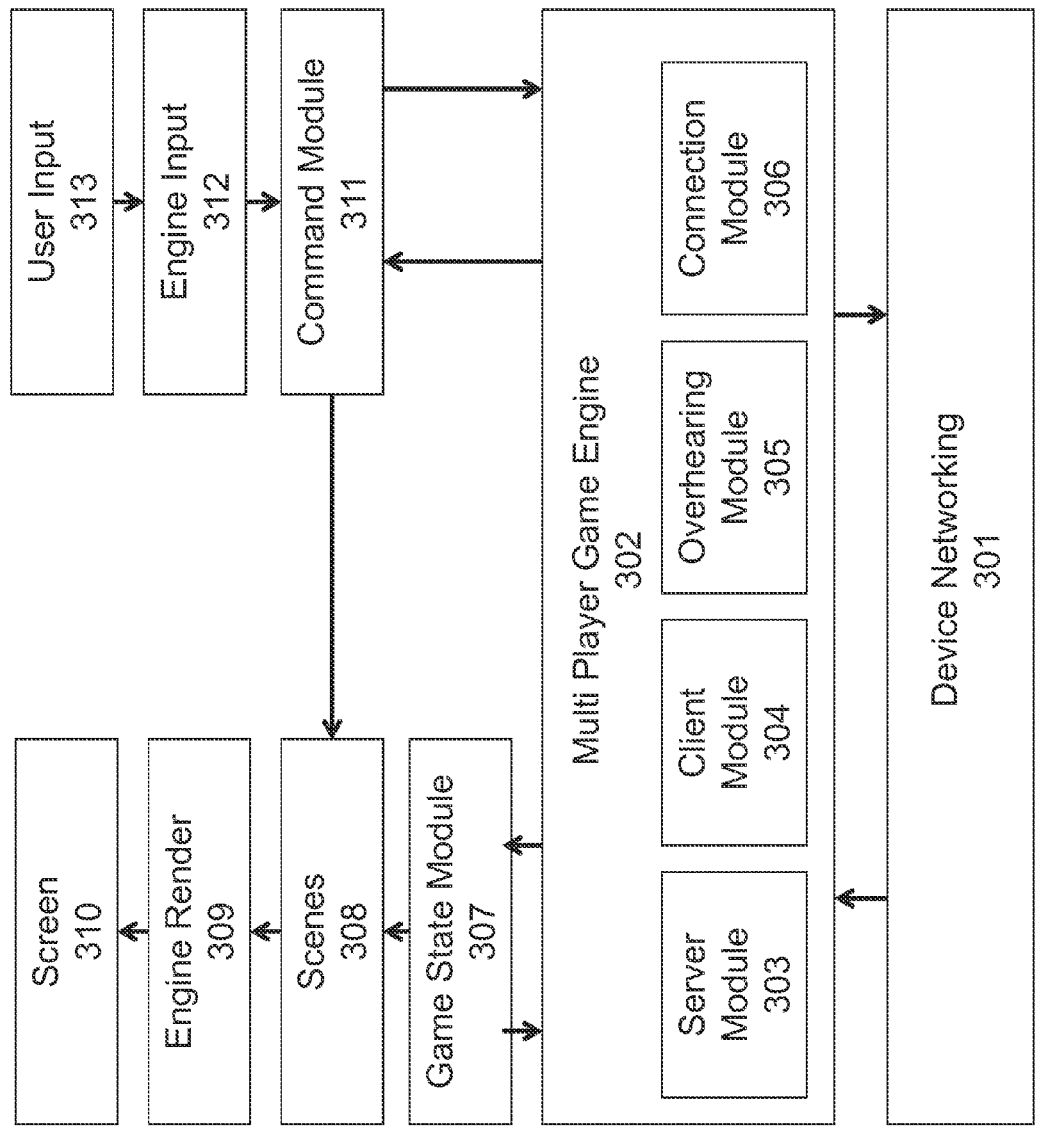
FIG. 3 illustrates an exemplary game architecture for use with the present system, according to one embodiment.

FIG. 3 illustrates an exemplary game architecture for use with the present system, according to one embodiment. Phones participating in the game are organized in an 802.11 basic service set (BSS). One of the phones, the server, acts as an access point (AP) while the other phones act as clients and connect to it. A connection module 306, as part of a multi player game engine 302, sets up this network and configures the IP connectivity when the game starts. The connection module 306 enables a software-based access point (soft AP) and a DHCP server. The server can broadcast frames to all clients; clients can only unicast frames to the server. Each client maintains a TCP connection to the server, used as a reliable control channel, and also listens for UDP packets. The server broadcasts UDP messages using IP broadcast and the clients unicast UDP packets to the server. According to one embodiment, the connection module 306 can be implemented using non-public APIs provided by, example, the Android WiFiManager. Once the local AP is enabled, the connection module 306 opens a UDP socket that is subsequently used to broadcast state packets and to receive command packets. It also binds a TCP socket to receive connections from clients. If the player wants to join an existing game (user input 313), the standard API of WiFiManager is used to discover the BSS created by the server, to connect to it and to obtain an IP address. After acquiring an IP address, the module establishes a TCP connection to the server. The TCP channel is used to transmit control packets that notify clients of connections and disconnections of players.

An overhearing module 305 provides an API to let each client overhear UDP command packets sent by all other clients to the server. To enable overhearing of UDP packets, the overhearing module 305 opens a raw socket and sets the network interface 301 into promiscuous mode by running an external executable daemon called overhearing$_d$ as root. Overhearing is necessary because when connected to an AP, the clients cannot broadcast frames; they have to first send them to the AP that will then broadcast them. Therefore, without overhearing, it is not possible to achieve a direct client-to-all communication.

According to one embodiment, the overhearing$_d$ daemon is implemented in C. It filters packets received from the raw socket and delivers the relevant packets to the overhearing module using a named pipe. The overhearing module 305 contains a JNI library that wraps the system call select to perform non-blocking reads from the named pipe, which is not possible using only the Android Java API.

A server module 303 runs on the server and periodically takes snapshots of the game and sends them in state packets to all clients using IP broadcast. The server module 303 detects client disconnection as well as accepts new client connections.

A client module 304 runs on the server (as the server is also a player) and all clients. The client module 304 periodically samples input commands 313 of the local player and sends these commands in command packets to the server. It parses overheard packets to obtain command packets.

According to one embodiment, the client module 304 and server module 303 are implemented as update handlers of a game engine (referred to in FIG. 3 as Engine). Update handlers are called once per screen redraw. This single thread approach was chosen to tightly control the scheduling of network operations. Since the handler code is run in the main game rendering thread, it cannot block. For this reason, all I/O operations are performed using non-blocking calls provided by the Android NIO API. Note that both client and server modules can be ported to other game engines as independent threads.

A command module 311 serializes commands performed by the local user (user input 312 and engine input 312) to a binary representation that is then put in command packets and sent by the client module 304. The command module 311 also parses the serialized commands contained in the received command packets. Finally, the command module 311 applies the commands generated by the local player and overheard from the other players to the local game scene 308 that is rendered 309 on screen 310. Note that command packets contain a generation time and are applied to the local scene only when the rendering time reaches it.

On the server, a game state module 307 serializes the current local scene to a binary representation that is then sent in state packets. On a client, the game state module 307 updates the local scene using the content of received state packets. Every state packet is accompanied with a timestamp that indicates when it has been created. Similar to a command, a game state is only processed when the rendering time reaches it.

Furthermore, the game state module 307 only applies a game state if the current scene, which is the result of applying the overheard command packets, is significantly different from the received game state. This situation is referred to as a sync error. This error may come from a variety of sources, such as missing command packets or diverging results of physics simulation on the server and the clients due to difference of system clocks. The game developer decides when to correct the local scene based on the type of games since in many games, minor errors can be tolerated.

The authoritative game time is the server time. Clients synchronize their game time based on the time indicated in the periodic state packets sent by the server. This approach does not take into account the one-way trip time between the server and the clients, which is negligible (a few ms). With this approach, sporadic time synchronization errors due to transient network conditions and systematic errors due to differences in frequency of the client and server clocks are quickly fixed.

Figure 4:
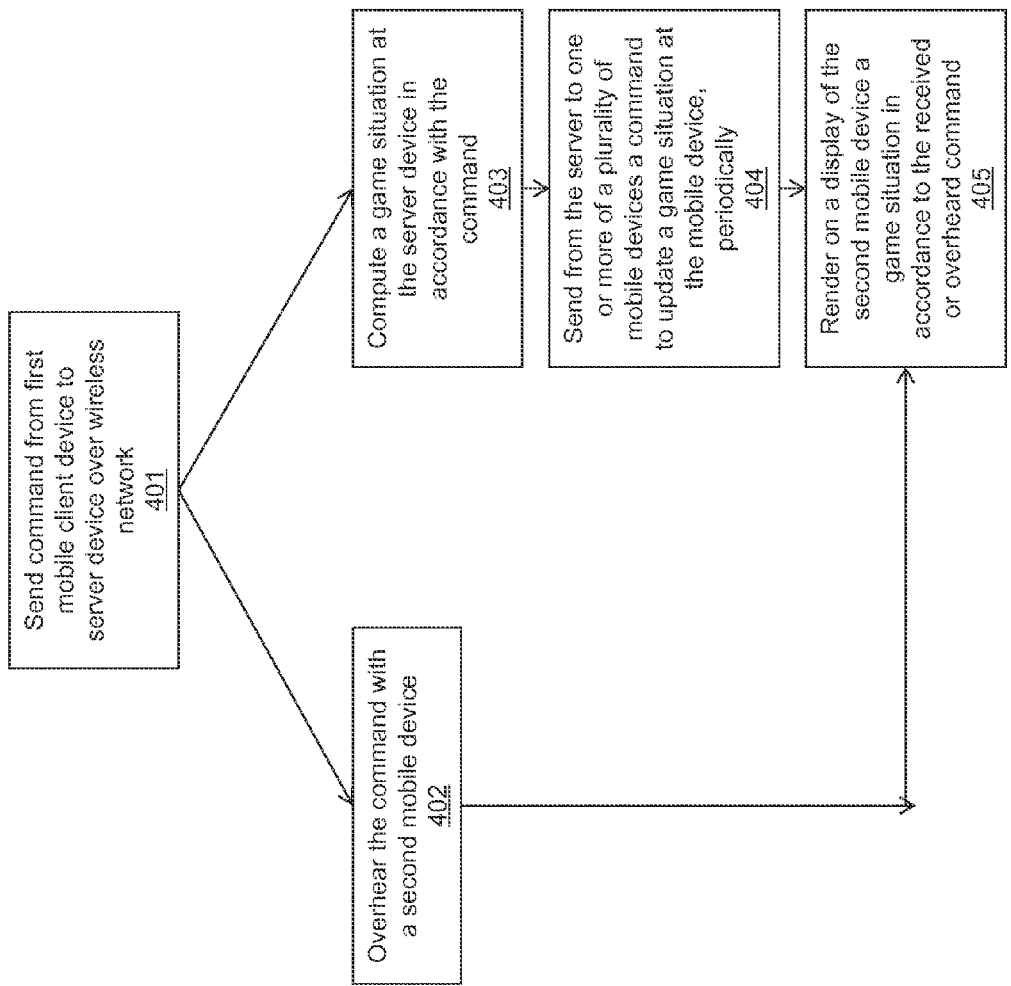
FIG. 4 illustrates an exemplary multi player game method for use with the present system, according to one embodiment.

FIG. 4 illustrates a multi-player game method for use with the present system, according to one embodiment. A command is sent from a first mobile client device to a server device over a wireless network 401. A second mobile device can overhear the command 402. A game situation in accordance with the overheard command is rendered 405 on a display of the second mobile device.

The server, also in receipt of the command sent from the first mobile device, computes a game situation (e.g. game state) in accordance with the command 403 and periodically sends a command to update the game situation 404. The server can send a command in multicast to update the game situation to a plurality of mobile client devices, or the server can send a command in unicast to one client device and the other client devices can overhear the sent command. A game situation in accordance with the command (received from the server or overheard) is rendered on a second mobile device 405. The server sends update commands periodically, and less frequently than user commands are sent, according to one embodiment.

In order to evaluate an embodiment of the present system, an exemplary multiplayer racing game called Racer is implemented using a game engine. Racer serves as an example application to demonstrate key properties of the underlying engine according to one embodiment of the present system. It will be appreciated that the present method and system is intended to support many different games that can benefit from its capabilities.

Figure 5:
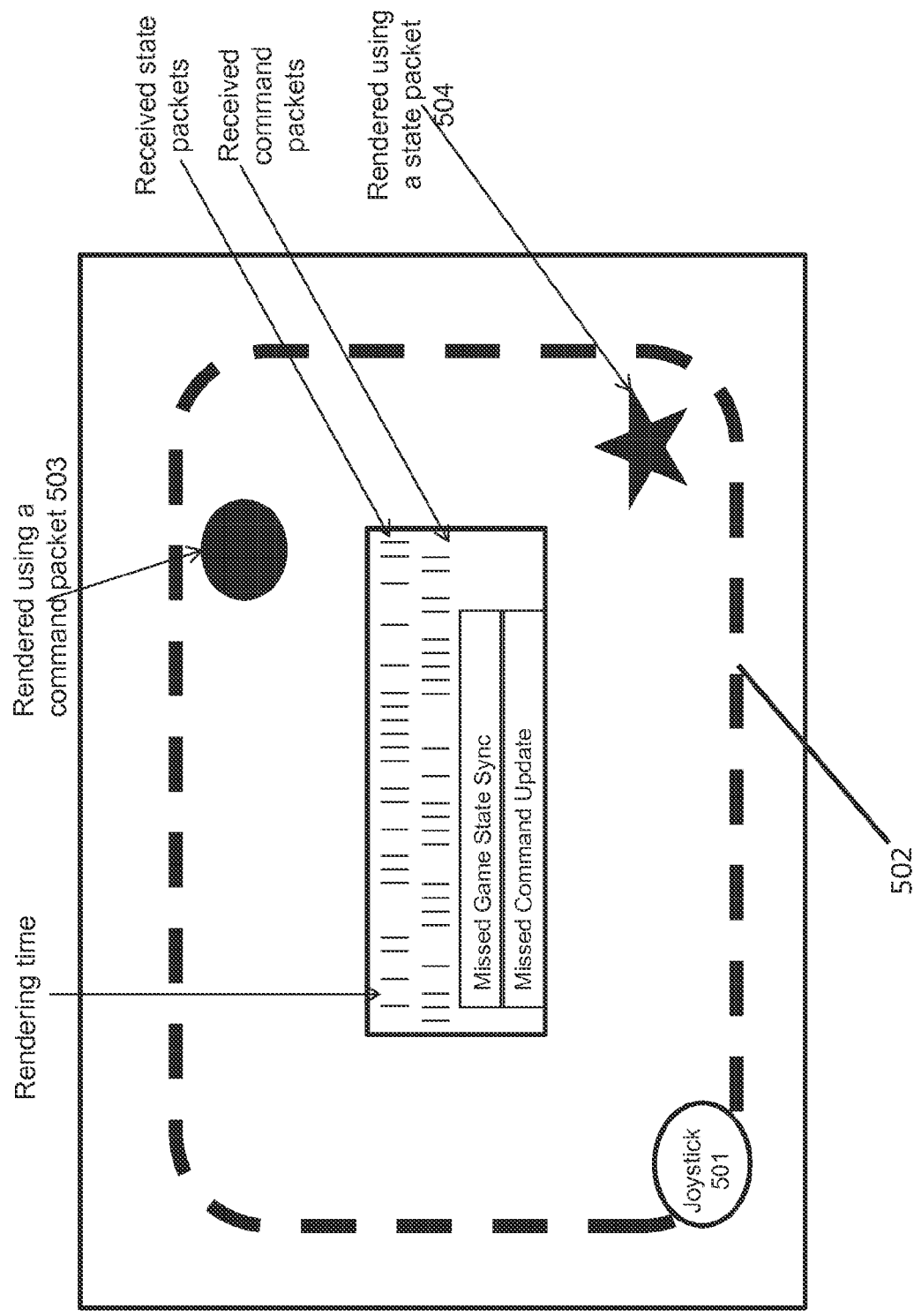
FIG. 5 illustrates an exemplary interface to an exemplary game for use with the present system, according to one embodiment.

FIG. 5 illustrates an exemplary interface to an exemplary game for use with the present system, according to one embodiment. In a game session, several players race their cars around a terrain 502. Each player controls her own car using an on-screen analog joystick 501.

In the exemplary implementation, the command module 311 samples an input command by recording the current position of the joystick 501, which comprises x and y positions. It applies a command by adjusting the velocity and angle of the car based on the pair (x, y). The game state module 307 takes a game snapshot by recording the positions, velocities, and angles of all cars. It applies a snapshot by updating all the players cars from the recorded values.

In Racer, all of the received state and command packets are tracked and plotted. Whenever a car state is updated as a result of applying a command, a blue dot (or in FIG. 5 a black circle 503) appears on the screen, at the current position of the car. On the other hand, whenever a car state is updated as a result of applying a game state, a white dot appears on the screen (or in FIG. 5 a black star 504). This helps keep track of how the cars are rendered.

The game engine provides a multiplayer extension to support development of multiplayer games. This extension facilitates client-server connection establishment, including automatic server discovery. All players must join an existing WiFi network, and use unicast TCP connections to send all packets from clients to the server and vice versa. As a baseline for comparison, Racer is adapted in one embodiment so that it works with the multiplayer extension. In other words, when using the multiplayer extension, all packets of Racer are sent using unicast sessions over TCP.

Figure 6:
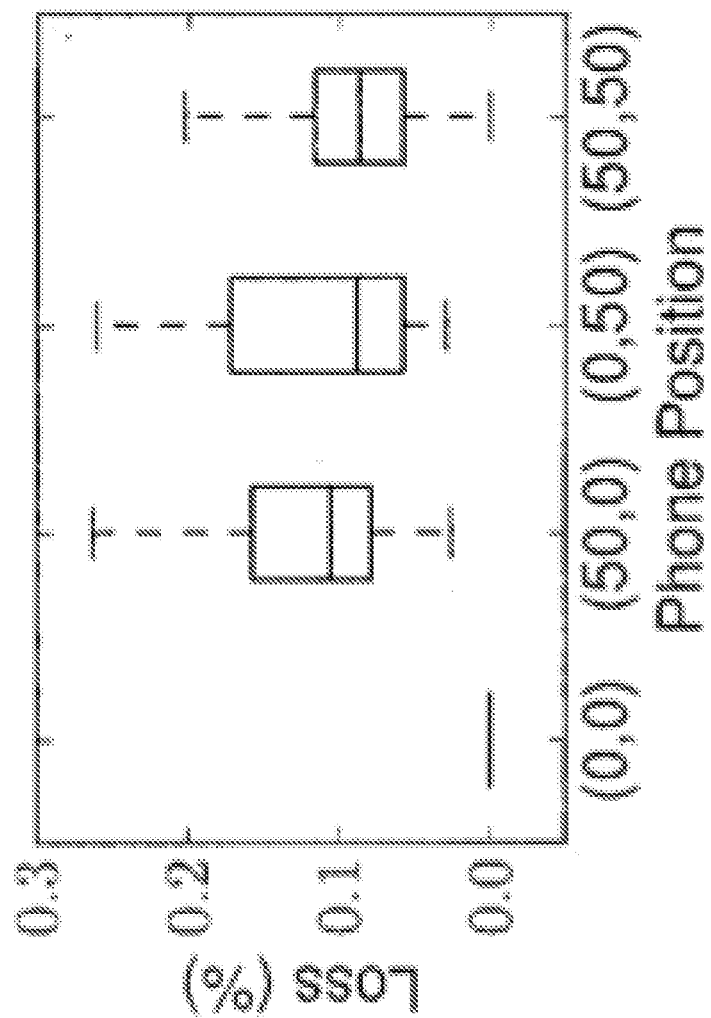
FIG. 6 illustrates the percentage of commands lost, averaged over all players when 4 players are sitting around a table.
Figure 7:
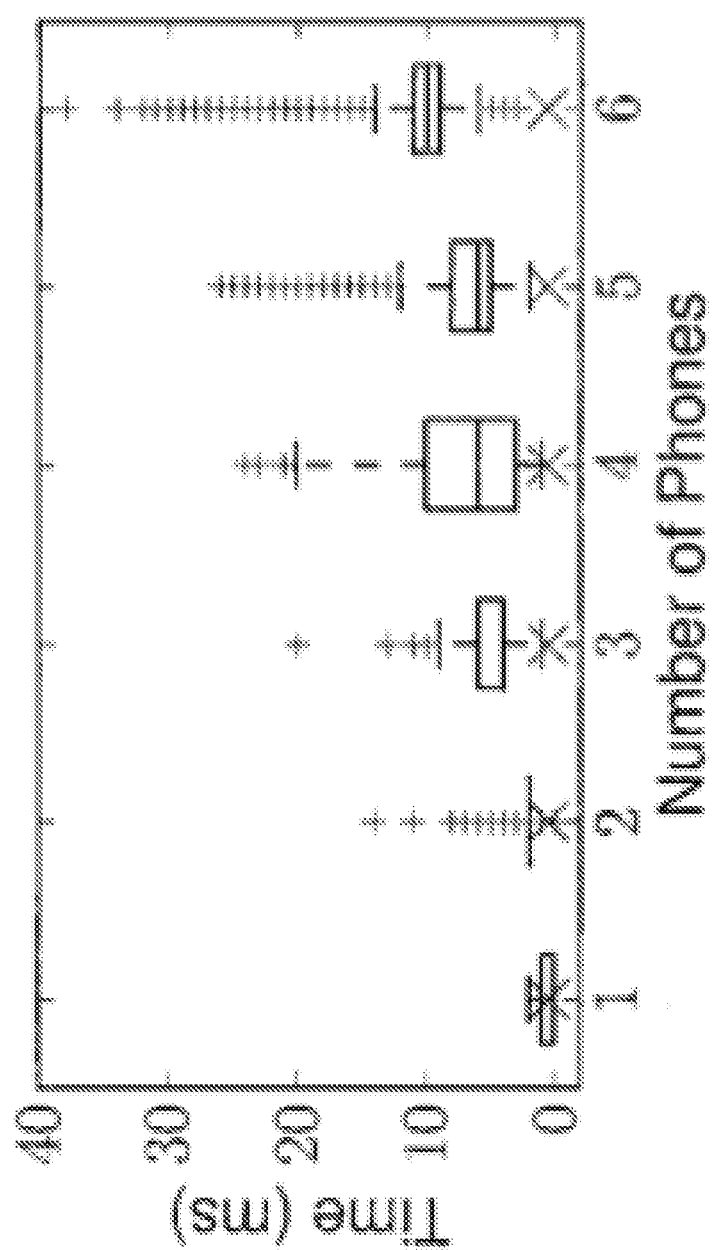
FIG. 7 illustrates the time needed to send one state packet as the number of players increases, according to one embodiment of the present system.

FIGS. 6 and 7 illustrate exemplary experimental results, according to one embodiment of the present system. For evaluation purposes, multiple sessions of Racer are run with up to 6 players. For example, the command sampling interval is set equal to the redrawing interval (frame rate) of the game, at 20-30 ms, and the state sending interval is set at 80 ms. Upper and lower bounds for the box plots in FIGS. 6 and 7 are the first and third quartiles, and lines in the boxes are the medians.

According to one embodiment, the present system relies on the assumption that every client can overhear command packets sent by the others. In order to verify this assumption, the percentage of command packets is measured that each node cannot receive. To detect packet loss, a sequence number is attached to every command packet. During a run of Racer for 20 minutes, packet loss is measured every minute. The experiments were conducted in a residential area with a high number of co-located WiFi networks.

FIG. 6 illustrates the percentage of commands lost, averaged over all players when 4 players are sitting around a table. Phones are positioned in a square whose side is 50 cm. The node at position (0,0) is the server. In this experiment, the server does not lose any command packet since all players send command packets to the server as UDP unicast packets and therefore they are re-transmitted multiple times if the server does not acknowledge (ACK) them. Other phones lose some of the updates but no more than 0.25% of them.

Since missing command packets can cause sync error (as discussed above), the number of times that state packets were used to resynchronize game state was recorded. A sync error in Racer is when a car position is 10 pixels off of its correct position. Results indicate, on average, less than 3% of state packets were used for resynchronizing. This shows that majority of the time, it is sufficient to render all players using just the (overheard) command packets.

In another experiment, the effect of distance between the clients and the server is evaluated. The phones were placed on a line with distance between two consecutive phones of 8 cm. The phone at the beginning of the line is the server. The results indicate that the loss rate increases with the distance from the server. Although the loss rate was higher than in the previous experiment, the upper quartile was still below 1%.

FIG. 7 illustrates the time needed to send one state packet as the number of players increases, according to one embodiment of the present system. A significant advantage of the present system is the use of broadcasting to efficiently disseminate state packets to the clients. The median time increases with the number of players when a multiplayer extension is used, but stays flat when the present system is used (less than 2 ms to broadcast the state packet, as an example).

In experiments of up to 6 phones implementing the present system, observations include that players are rendered at the rate at which their inputs are sampled, which equals the game's frame rate (at 20-40 ms for 25-50 frame per sec., as an example). This latency is much smaller than the latency typically needed for highly interactive multiplayer games (~100 ms, as an example). Smooth rendering is possible without the need of any prediction (interpolation or extrapolation) code.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

A system and method for local multiplayer gaming have been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

What is claimed is:

1. A system for local multiplayer gaming comprising a plurality of mobile devices including an individual mobile device of the plurality of mobile devices designated as a server device and other mobile devices of the plurality of mobile devices designated as client devices, wherein the client devices include more than two mobile devices, each mobile device comprising:
  a display;
  at least one local network interface for communication with each of the other mobile devices; and
  a processor programmed for
    playing a multiplayer game with other mobile devices; and
    rendering on the display a game situation directly corresponding to a command or information transmitted by the server device to an individual client device or transmitted by an individual client device to the server device or another client device;
  wherein each individual mobile device of the plurality of mobile devices is configured to overhear a command or information transmitted by each of the other mobile devices of the plurality of mobile devices to the server device or to an individual client device and direct-input render on the display of each mobile device a game situation corresponding directly to the overheard command or information, wherein a command or information transmitted by the server to an individual client device or by an individual client device to the server device or to another individual client device is overhearable by each of the other mobile devices of the plurality of mobile devices that are not the recipient of the transmitted command or information, and wherein a game situation directly corresponding to the overheard command or information is direct-input renderable on the display of each of the plurality of mobile devices.

2. The system of claim 1, wherein the direct-input rendering comprising the rendering of an object of the individual mobile device that sent a command or information by each of the other mobile devices that overheard the command.

3. The system of claim 1, wherein the mobile devices are configured for communicating between individual mobile devices using a broadcast protocol or a unicast protocol and are configured for overhearing the communication between other mobile devices.

4. The system of claim 1, wherein one of the server device and a client device acts as an access-point device.

5. The system of claim 1, wherein the server device broadcasts UDP state and/or command packets, while each client device unicasts UDP command packets to the server and maintains a TCP connection to the server device as a control channel.

6. The system of claim 1, wherein each of the mobile devices comprises:
a first software module configured for setting up at least one local network with the other mobile devices of the plurality of mobile devices; and
a second software module configured for allowing each of the mobile devices to overhear a command or information transmitted by each of the other mobile devices of the plurality of mobile devices to the server device or an individual client device.

7. The system of claim 6, further comprising:
a third software module, configured for sampling input signals of the mobile devices of the plurality of mobile devices and sending the input signal as a command to one of the server device and an individual client device.

8. The system of claim 6, wherein the first software module being a connection module.

9. The system of claim 6, wherein the second software module being an overhearing module.

10. The system of claim 7, wherein the third software module being a client module.

11. The system of claim 6, further comprising a rendering software module for rendering a game situation directly corresponding to an overheard command.

12. The system of claim 11, wherein the rendering software module being arranged for updating the rendering of the game situation when a game situation updating command has been received from the server device.

13. A method for playing a local multiplayer game on a multiplayer game system comprising a plurality of mobile devices including an individual mobile device of the plurality of mobile devices designated as a server device and other mobile devices of the plurality of mobile devices designated as client devices, wherein the client devices include more than two mobile devices, the method comprising:
transmitting a command or information from the server device to an individual client device or from an individual client device to a server device or another client device of the plurality of mobile devices over a wireless local network;
overhearing the transmitted command or information with each of the other mobile devices of the plurality of mobile devices that are not the recipient of the transmitted command or information; and
rendering on a display of each of the plurality of mobile devices a game situation directly corresponding to the overheard command or information, wherein the rendering of the game situation directly corresponding to the overheard command or information on the display of each of the other mobile devices of the plurality of mobile devices that are not the recipient of the transmitted command or information is by direct-input rendering.

14. The method of claim 13, further comprising:
computing a game situation in the server device, taking into account the transmitted command;
transmitting in multicast from the server device a command to update the game situation to the plurality of mobile devices, or transmitting in unicast from the server device a command to update the game situation to an individual client device while the other client devices overhear the command; and
updating the rendering of the game situation in each of the plurality of mobile devices upon receipt of the command to update the game situation by the plurality of mobile devices.

15. The method of claim 13, wherein the direct-input rendering comprising the rendering of an object of the individual mobile device that sent a command or information by each of the plurality of other mobile devices that overheard the command.

* * * * *